March 8, 1949. O. F. ARTHUR 2,463,587
PALLET
Filed Aug. 18, 1945 2 Sheets-Sheet 1
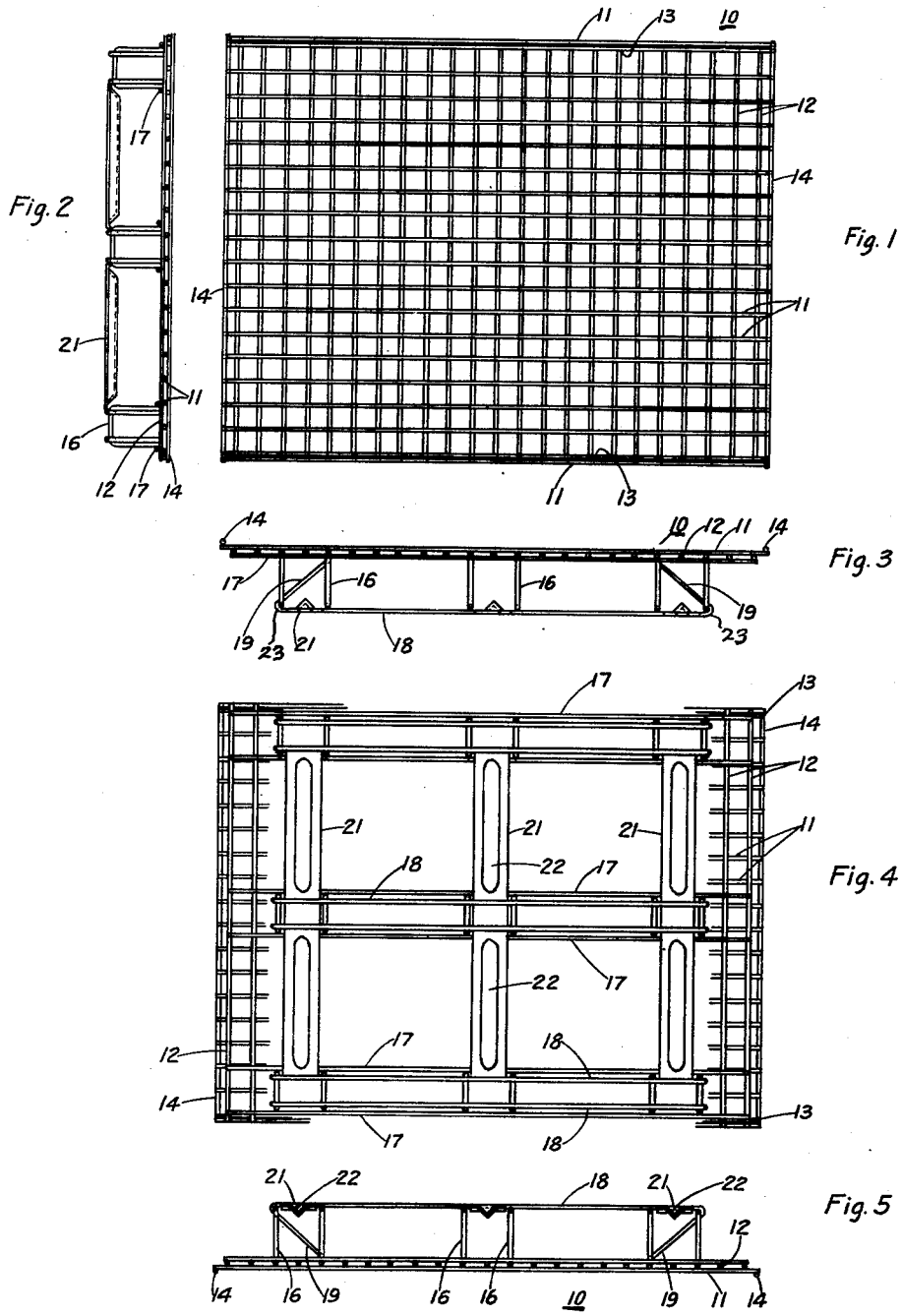

March 8, 1949.   O. F. ARTHUR   2,463,587
PALLET

Filed Aug. 18, 1945   2 Sheets-Sheet 2

WITNESSES:

INVENTOR
Oscar F. Arthur
BY
Archworth Martin
ATTORNEY

Patented Mar. 8, 1949

2,463,587

UNITED STATES PATENT OFFICE 2,463,587

PALLET

Oscar F. Arthur, Belle Vernon, Pa.

Application August 18, 1945, Serial No. 611,332

7 Claims. (Cl. 248—120)

My invention relates to pallets or portable platforms, such as those utilized in stacking and handling shipping cases and other articles. Such structures are designed for use with trucks having lifting bars or tongues projecting forwardly thereof into position beneath the pallets to lift them and to transport them from place to place, as well as to stack them on one another.

One object of my invention is to provide a pallet of light weight relative to forms of pallets heretofore employed and which, nevertheless, is of adequate strength and durability.

Another object of my invention is to provide pallets of such form that they can readily be stacked upon one another as well as stacked in superposed relation when they are loaded.

Still another object of my invention is to provide a pallet to which packages or other articles can readily be lashed and which can conveniently be handled by slings.

A further object of my invention is to provide pallets that while they are of sufficient strength to support heavy loads, they have some yieldability so that they will, under certain conditions, cushion their loads against shocks and consequent damage thereto.

Figure 6:
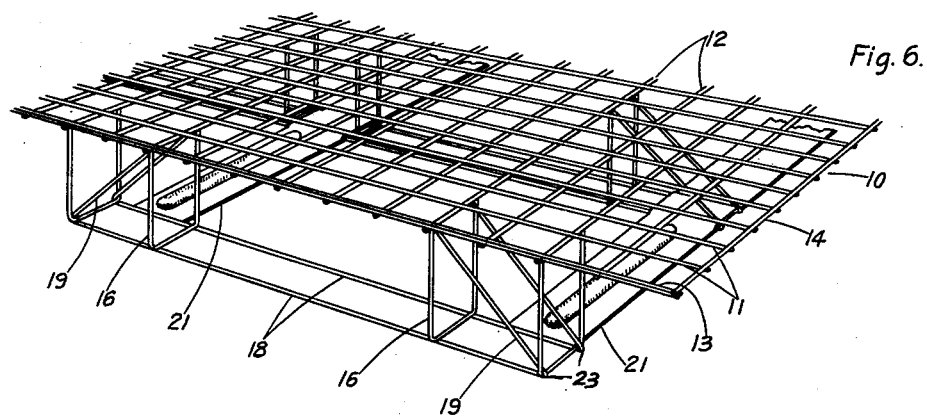
Figure 7:
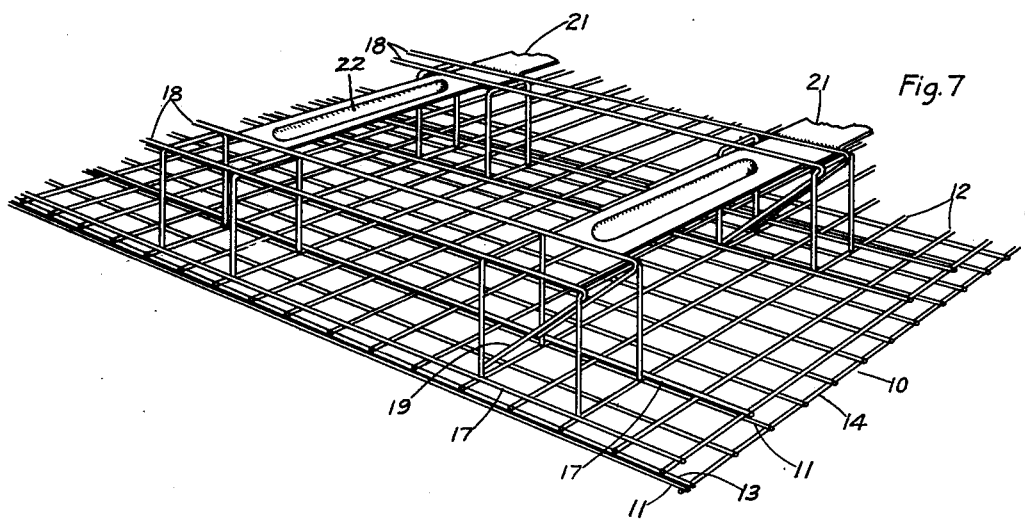

In the accompanying drawings, Figure 1 is a plan view of a pallet; Fig. 2 is an end view thereof; Fig. 3 is an edge view; Fig. 4 is an inverted plan view of the pallet of Fig. 1; Fig. 5 is an edge view of the pallet in inverted position; Fig. 6 is a perspective view, on an enlarged scale, of the pallet in upright position, and Fig. 7 is a perspective view, on an enlarged scale, of the pallet in inverted position.

The pallet comprises a deck or table portion 10 formed of longitudinal rods or wires 11 that are welded to transverse rods or wires 12, additional longitudinal and transverse rods being provided at 13 and 14 respectively to further stiffen the edges of the mesh structure formed by the wires 11—12. These various wires and rods can conveniently be welded together on continuous welding machines of well known types, to form the deck or table portion of the pallet.

The deck portion of the pallet extends at both ends beyond the legs and the base portion thereof, to permit of conveniently placing slings beneath these projected deck portions, when the pallets are to be handled by hoists or cranes instead of by "chisel or lifting" trucks. Also, the mesh formation of the deck permits of conveniently lashing packages or containers on the pallet, to various of the longitudinal and transverse deck rods, so that small packages as well as large packages can be firmly strapped or tied in place, and held against shifting.

Legs 16 for the pallet are here shown as formed of U-shaped rods whose upper ends are welded to the mesh 10, the upper ends of these U-shaped members being reinforced by longitudinally-extending rods 17 (Fig. 7) that are welded to the sides of the legs and to the upper mesh.

At their lower ends, the legs are connected together by tie rods 18 that are welded to the under sides thereof, the forward and rear ends of these rods being bent upwardly and backwardly at 19 to form struts or braces for the legs.

The members 16, 17 and 18 can initially be formed as flat mats, on a welding machine and then bent upwardly to bring the rods 17 and the sides of the legs 16 against the deck, for welding thereto, as described and claimed in my copending application Serial No. 614,203 filed September 4, 1945, now abandoned.

The various wires or rods can be of suitable gauges, such as 2 gauge to 4-0 gauge, depending upon size and strength of pallet desired.

The legs are braced in lateral directions by plates 21 that are welded thereto, either before or after the bending of the legs as above explained, the plates being deflected or bent upwardly at points where they cross certain of the tie rods 18. The intermediate portions of these base plates are depressed as shown more clearly in Figs. 2 and 7, so that they are flush with the lower surfaces of the tie rods 18. The plates have corrugations or depressions 22 formed therein to stiffen the same.

The legs are of sufficient distances apart to permit the insertion of the lifting arms of trucks by which they are to be handled, from either the ends or the sides of the pallets, and the base plates 21 not only serve as braces against lateral stresses, but the lowermost faces thereof serve as convenient seating surfaces when the pallets are stacked on one another or loaded pallets mounted in stacks. Also, the bends 23 of the rods 18 enable them to serve somewhat as runners when the pallet is slid along a floor, and to avoid sharp corners that would dig into the floor, when the pallet is tilted.

Notwithstanding the mesh-like form and light weight of the pallet, it has great strength and resistance to shocks, because it is yieldable throughout and thus effects distribution of weight and other stresses. To facilitate and increase such distribution of stresses, I prefer to make the leg members 16 of a spring steel quality.

I claim as my invention:

1. A pallet comprising a deck portion formed of longitudinal and transverse rods welded together in relatively superposed relation and in the form of a grating, leg members of generally U-form having their ends welded to the grating and their loop portions extending downwardly, tie members welded to the lower portions of a plurality of leg members, and reinforcing rods welded to the undersurface of the mesh and to the sides of the leg members.

2. A pallet comprising a deck portion in the form of a grating, leg members of generally U-form having their ends welded to the grating and their loop portions extending downwardly, tie members welded to the lower portions of a plurality of leg members, and brace rods welded to the under face of the mesh and to the sides of the leg members.

3. A pallet comprising a deck portion formed of longitudinal and transverse rods welded together in the form of a grating, leg members of generally U-form having their ends welded to the grating and their loop portions extending downwardly, tie rods welded to the lowermost portions of a plurality of leg members, and base plates secured to said tie rods and extending transversely thereof.

4. A pallet comprising a deck portion, legs having their upper ends secured to the deck, and metallic tie members secured to the lower ends of the legs, in laterally-spaced relation, the ends of the tie members being inclined upwardly and secured to the deck, so that they may serve as brace members.

5. A pallet comprising a deck portion having a load-receiving surface, groups of leg elements of rod-like form having their upper ends secured to the deck, the groups being spaced apart in laterally and longitudinally arranged rows, and the elements of each group being laterally spaced from one another a distance less than the spacing of the groups, and tie members connecting the lower ends of each group to one another and also connecting the groups against relative horizontal displacement.

6. A pallet comprising a deck portion having a load-receiving surface, groups of leg elements of rod-like form having their upper ends secured to the deck, the groups being spaced apart in laterally and longitudinally arranged rows, and the elements of each group being laterally spaced from one another a distance less than the spacing of the groups, and tie members welded to the lower ends of the leg elements, in position to hold the leg elements of each group against horizontal displacement relative to one another and relative to the other groups, some of the tie members being in the form of metal plates in planes parallel to the plane of the deck.

7. A pallet comprising a deck portion formed of longitudinal and transverse rods welded together in the form of a grating, leg members of generally U-form having their ends welded to the grating and their loop portions extending downwardly, and base plates each welded to the lowermost portions of a plurality of leg members, the plates being disposed in a plane approximately parallel to the plane of the said deck portion.

OSCAR F. ARTHUR.

REFERENCES CITED

The following references are of record in the file of this patent:

UNITED STATES PATENTS

| Number | Name | Date |
| --- | --- | --- |
| 1,698,038 | Warshaw et al. | Jan. 8, 1929 |
| 1,700,843 | Hayward | Feb. 5, 1929 |
| 2,081,602 | Rubenstein | May 25, 1937 |
| 2,190,065 | Griffin | Feb. 13, 1940 |
| 2,250,361 | Cullinan | July 22, 1941 |
| 2,341,542 | Grime | Feb. 15, 1944 |